United States Patent [19]

Wells

[11] 4,007,912
[45] Feb. 15, 1977

[54] PLUG TYPE CONTROL VALVE HAVING IMPROVED MEANS PROTECTING THE STEM THEREOF

[75] Inventor: Tommy L. Wells, Houston, Tex.
[73] Assignee: Pullman Incorporated, Chicago, Ill.
[22] Filed: Nov. 13, 1975
[21] Appl. No.: 631,769
[52] U.S. Cl. .............................. 251/355; 23/288 E; 23/288 S
[51] Int. Cl.² ...................... B01J 8/08; F16K 41/02
[58] Field of Search .......... 23/288 E, 288 B, 288 S; 137/237, 340, 375; 251/355

[56] References Cited

UNITED STATES PATENTS

| | | | |
|---|---|---|---|
| 2,664,338 | 12/1953 | Cornell | 23/288 S X |
| 2,668,755 | 2/1954 | Kershaw et al. | 23/288 S |
| 2,901,331 | 8/1959 | Held et al. | 23/288 S |
| 3,315,700 | 4/1967 | Greenwood | 137/375 |
| 3,339,577 | 9/1967 | Teegarden | 137/375 |
| 3,846,080 | 11/1974 | MacLean et al. | 23/288 S |

Primary Examiner—Joseph Scovronek

[57] ABSTRACT

A plug type valve for use in handling the flow of particulate catalyst is disclosed. In catalytic cracking equipment, it is necessary to regenerate the catalyst. The flow of catalyst to and from the regenerator must be controlled. A plug valve is disclosed for control of the flow of catalyst and the valve includes a tapered spearlike plug formed of a sacrificial material mounted on a stem. The stem is protected against the abrasive action of the particulate catalyst by means of a cylindrical spaced shield below the valve element and a circular jet of steam ejected downwardly below the shield and parallel to the stem.

8 Claims, 3 Drawing Figures

PLUG TYPE CONTROL VALVE HAVING IMPROVED MEANS PROTECTING THE STEM THEREOF

BACKGROUND OF THE INVENTION

Plug valves for use in control of the flow of the particulate catalyst in catalytic convertors are shown in U.S. Pat. Nos. 2,668,755 and 2,850,364. The plug valves shown in these disclosures have served quite adequately. A valve of the plug type is typically installed in the bottom of a regenerator vessel. It is mounted adjacent a pipe or conduit which typically extends through the wall of the vessel to position the plug in close proximity to a valve seat, typically located at the end of a pipe or conduit. Catalyst flows through the pipe and is metered past the valve seat by the position of the tapered plug valve. The catalyst is an abrasive material which has a propensity for abrading and wearing away the metal components of the plug valve. This is particularly a problem with the stem below the plug. The stem must work through an opening of specified size in the body of the valve. The vessel itself is pressurized and hence, it is necessary to prevent leakage from the pressurized vessel along the stem where it inserts through the wall of the body of the valve. Moreover, it is desirable to prevent particulate catalyst from working into the spaces between the valve stem and its supporting structure. Particulate catalyst in this area wears the stem away and weakens the structure.

The apparatus of the present invention is an improved plug mounted on a protected stem. The stem is protected in a significant fashion which avoids the problem of stem erosion by the particulate catalyst. The protective plug valve of this particular invention can be used both for the metering valve which admits spent catalyst to the regenerator and the valve which controls the flow of regenerated catalyst from a dense phase fluid bed in a regenerator into a catalytic reaction vessel.

This apparatus is particularly useful in extending the life of a metering valve in a catalyst regenerator. Continued operation of a catalytic reactor, disengager and the catalyst regenerator that is cooperative therewith is essential. When they are brought on line, they are normally intended to operate for months and hopefully for more than one year. During the continued use of such equipment, the valves which control the flow of the particulate catalyst are subjected to the type of wear mentioned above. Wearing of the valve stem of the plug valves which control the flow of the catalyst can become so excessive as to wear through the valve stem and cause it to break. Breakage of the valve stem normally constitutes a catastrophic failure requiring emergency shutdown of the catalytic process and emergency repairs. Shutdown is normally scheduled where maintenance on all parts of the equipment can be completed. An emergency shutdown to repair a single component is extremely undesirable, particularly in view of the fact that the lost revenues may easily exceed several thousand dollars per hour. In view of these circumstances, it will be understood that protection of the valve stem is exceedingly important and this invention provides that type of protection. The present invention protects the valve stem against significant contact with the particulate catalyst. The catalyst may settle in the vicinity of the valve stem but it does not otherwise abrade the surface of the valve stem in significant measure. This invention thus extends the life of the stem substantially and avoids catastrophic shutdowns.

SUMMARY OF THE INVENTION

This invention is summarized as a plug valve for use in an environment of particulate catalyst. The plug valve is mounted on a stem. The stem is protected by the incorporation of a tubular shield attached to the upper portions of the stem. The stem travels upwardly and downwardly and carries the shield with it. The shield is spaced outwardly from and encircles the stem. The shield in addition has an internal cavity. The stem works up and downwardly in a guide tube which receives a flow of steam upwardly therethrough into the shield and a set of ports turn the flow of steam downwardly in a concentric jet of steam around the exterior of the guide tube and below the shield to prevent abrasive contact of the stem with the particulate catalyst.

DESCRIPTION OF THE PREFERRED EMBODIMENT

Figure 1:
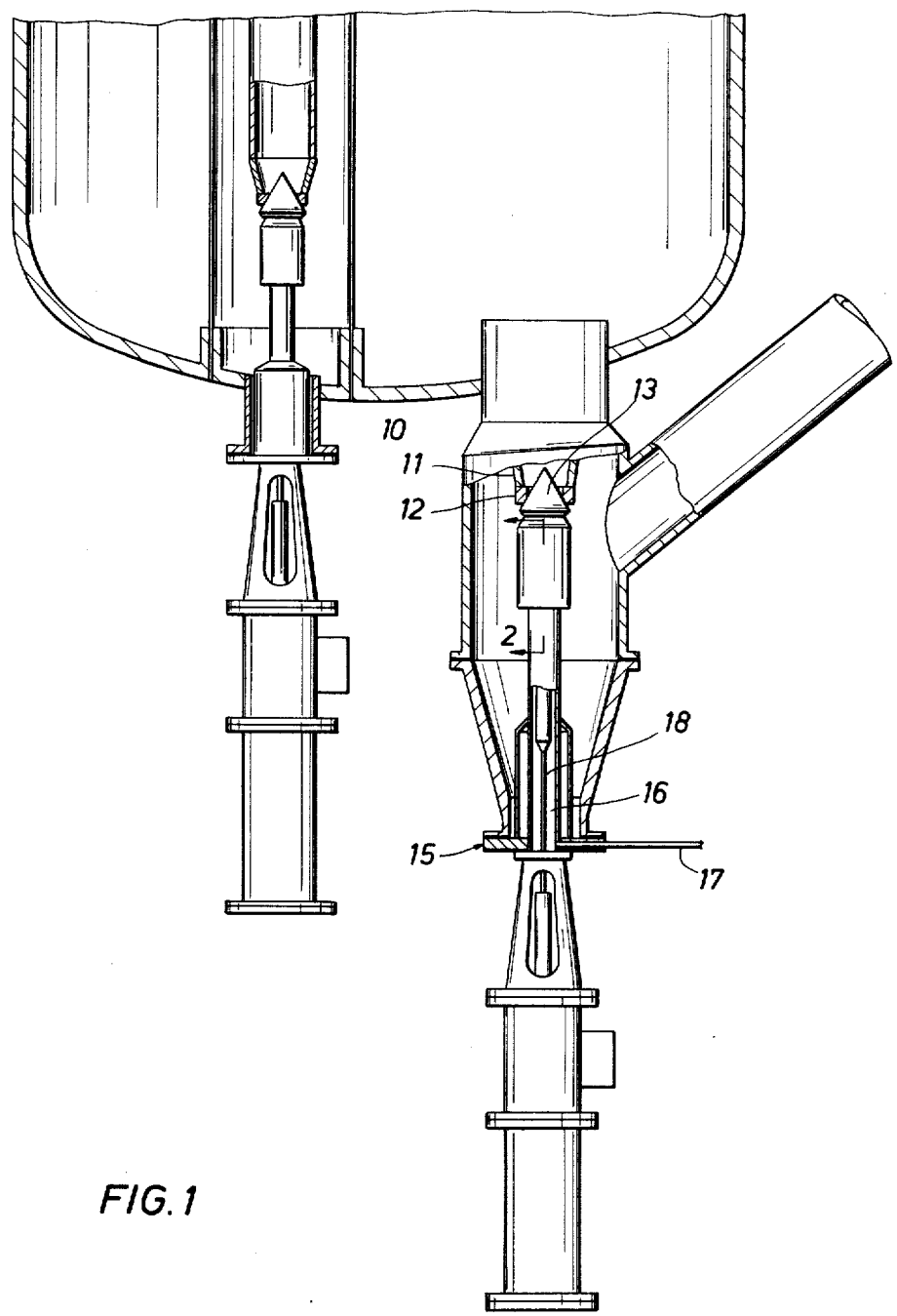
FIG. 1 is a sectional view showing a lower regenerator chamber incorporating plug valves with improvements in accordance with the present invention.

In FIG. 1, a regenerator vessel is identified by the numeral 10. A conduit 11 conducts particulate catalyst downwardly. The conduit is shaped at the bottom end to define a valve seat 12. The valve seat mates against a tapered plug 13. The plug 13 fits into the valve seat to plug the conduit 11. A fluid bed is accumulated in the bottom of the pressure vessel 10. The fluid bed includes particulate catalyst which has the ability to substantially abrade the valve stem. A movable stem reciprocates upwardly and downwardly and moves the tapered plug 13. The numeral 16 identifies a steam chest which is supplied with the steam from a line 17. The cavity 16 comprises a fitting which is located in the side of the flange 15 whereby the cavity 16 supplies steam upwardly to the protective shield.

Figure 2:
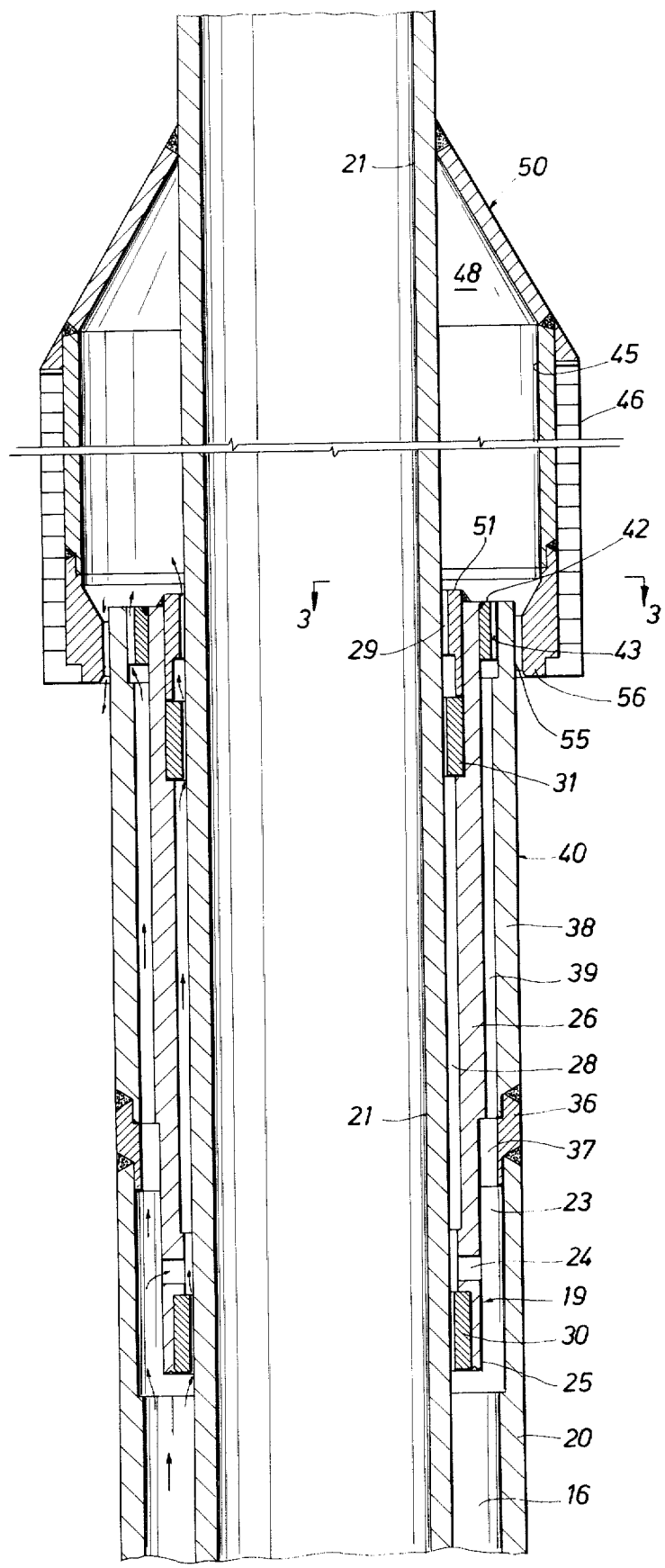
FIG. 2 is an enlarged sectional view showing a protective shield which prevents abrasion of the valve stem by the particulate catalyst.
Figure 3:
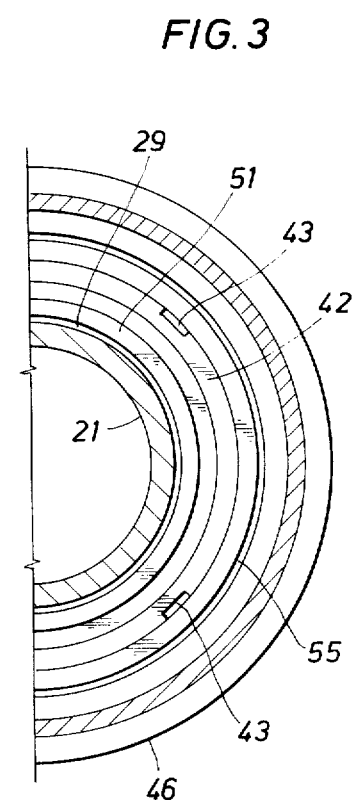
FIG. 3 is a sectional view along the line 3—3 of FIG. 2 showing the details of construction of the apparatus.

Attention is directed to FIG. 2 of the drawing which shows the apparatus in enlarged view. The cavity 16 is shown below a tubular member 26 which rests on a guide tube 20. The guide tube 20 is stationary. It is fixed to the flange 15. The guide tube 20 encircles the lower end of the moving apparatus. The apparatus which is on the interior includes a movable stem tube 21. The stem tube 21 is hollow as shown in FIG. 2. It extends downwardly and connects to the rod 18 shown in FIG. 1. It is not necessary to be hollow to serve as a conduit but rather this provides some weight reduction. The stem tube 21 is somewhat smaller than the interior of the guide tube 20. This defines the upper portion of the cavity 16. Steam flows upwardly through the annular cavity. Steam is introduced through the line 17 which passes through the wall of the guide tube 20, thereby introducing steam into the annular portion of the cavity 16. The steam flows upwardly throughout the cavity 16.

The stem tube 21 slides interiorally of a tubular member 26 which has a number of ports at 24 at the lower end 25. The ports extend radially inwardly and stop short of the stem tube 21. The tubular members 21 and 26 define an annular space 28. Steam flows upwardly through the annular space 28. The lower end 25 of tubular member 26 encloses a guide ring 30. The ring 30 is positioned by planting the edge of the tubular member 26 over a bevel on the guide ring 30. The set of grooves 19 align with the ports 24 to direct steam flow along the desired path. The ring 30 aligns the stem tube for movement upwardly and downwardly. The annular cavity 28 extends upwardly to an upper guide ring 31. The ring 31 guides the stem tube 21 on movement through the tubular member 26. In conjunction with the ring 30, the two control the width of the annular space 28.

The guide tube 20 ends midway up the supporting structure and a support ring 36 is integrally joined thereto. The ring 36 supports for the tubular member 38 which with the tubular member 26 defines the annular cavity 39. Steam is introduced into the annular cavity 23 from the several grooves 19 in the tubular member 26. The steam flows upwardly through the grooves 37 into the annular cavity 39.

The tubular member 26 is fixed in location as mentioned above. It supports a top tubular member 42 between the tubular members 26 and 38. The member 42 is grooved with a number of slots at 43. The openings serve as an outlet for steam flowing in the annulus 39. The outlet opens within a shield member 45. The shield member 45 has a metal body on the interior of a refractory material 46 which is on the exterior. The refractory material provides a hard facing which is not abraded by the particulate catalyst impinging thereon.

The shield 45 defines an internal cavity 48. The shield 45 is closed across its top end 50 as shown in FIG. 2. The top end 50 of the shield is just below the plug valve element 13 as shown in FIG. 1. Indeed, it can be just a fraction of an inch therebelow to protect even the uppermost reaches of the neck of the valve stem.

The shield 45 is a concentric tubular member around the stem tube 21. The stem tube 21 imparts reciprocating vertical movement to the plug 13. The shield 45 is concentric about the stem tube 21 from the plug valve itself, for all intents and purposes, to the top of the guide tube. The tubular member 38 terminates at the member 42 previously mentioned. Stem 21 is substantially enclosed within the guide tube and the shield. The stem communicates necessary reciprocal movement to the valve plug itself.

The annulus 28 opens upwardly to an internal ring 51 mounted at the upper end of the tubular member 26. The ring 51 defines an annular opening which exhausts the steam flowing upwardly. As steam flows past the ring 51, it opens into the cavity 48 in the shield 45. Steam in the cavity 48 is thus introduced from both the annular space 28 and the annular space 39. It flows into the cavity 48 from two sources.

There is only a single outlet for steam introduced into the cavity. The single outlet for steam is through the annular space 55. The annulus 55 is defined by the inwardly protruding lip 56 appended to the bottom of the shield 45. The lip 56 extends inwardly towards the fixed tubular member 38, and is constructed with a hard facing material to resist erosion by flowing steam. The steam flowing through the gap 55 is jetted downwardly in a concentric ring around the tubular member 38, the support 36, or the guide tube 20, depending on their extended positions. Steam flowing downwardly from the annular gap 55 prevents catalyst from entering the cavity 48. The surfaces exposed to steam flow are preferably coated with a hard facing material. This also prevents catalyst from working into the narrow confines between the fixed and moving tubular members shown in FIG. 2. The flow of steam upwardly through the annular spaces 28 and 39 further ejects catalyst in the unlikely event that it enters into the cavity 48 within the shield 45. The brunt of the wear is experienced by the shield 45 which is provided with the hard faced surface 46. The hard facing on the surface enables the apparatus to endure for a substantially longer time.

Only a small volume of steam is required to protect the apparatus. The steam acts as a lubricant for the moving parts. The steam does not in any way affect the fluid bed which collects around the valve stem. Rather, it protects the valve stem from the particulate catalyst and prevents its intrusion into the working parts. The annulus 28 directs steam to engulf the surface of the stem 21 for the purpose of protecting it from direct contact with catalyst and especially the abrasive effect of catalyst in the narrow gap between the fixed and movable parts. The annulus 39 provides additional steam flow for the gap 55 which has a larger cross section than the annulus 29.

The stem shown in FIG. 2 is illustrated at the uppermost end of travel (normally associated with its cold position). The shield 45 is limited at the upper extremity of its movement. However, downward movement is permitted. On downward movement, the stem tube 21 moves downwardly and carries the shield 45 downwardly with it. The gap 55 is moved downwardly as the inwardly protruding lip 56 is moved downwardly. However, the gap 55 is constant in size, thereby continuing to eject the ring of steam jetted downwardly next to the side wall of the tubular member 38 thereby protecting its hardened surface 40.

This apparatus particularly extends the life of a valve stem. The shield and the jet of steam protect the apparatus. The valve stem is protected from erosion by the particulate catalyst by the flow of steam in the annulus 28. This protection enables the apparatus to function substantially longer without fear of interruption or shutdown as a result of catastrophic stem failure.

The foregoing is directed to the preferred embodiment. However, the scope hereof is determined by the claims which follow.

I claim:

1. A plug valve for controlling flow of an abrasive material through a mouth of a conduit, comprising:
    a housing;
    a valve stem movable within said housing;
    plug means mounted with said valve stem for movement between a first position in which said plug means blocks flow of abrasive material through the mouth of the conduit and a second position in which said plug means permits flow of abrasive material through the mouth of the conduit; and
    shroud means for protecting said valve stem from the abrasive material, said shroud means including:
    a tail section mounted with said housing and encircling a first portion of said valve stem, said tail section having an inner diameter greater than the outer diameter of said valve stem to form a cleaning fluid passageway between said tail section and said stem; and
    a head section mounted with said stem for movement therewith and encircling a second portion of said valve stem, said head section having a cleaning fluid cavity formed therein, said cleaning fluid cavity being in fluid communication with said cleaning fluid passageway to exhaust fluid from said cleaning fluid passageway.

2. The apparatus of claim 1, wherein said valve stem is elongate and said tail section of said shroud is an elongate right cylindrical member about said the valve stem.

3. The apparatus of claim 1, wherein said head section is closed at its upper end and attached to the valve stem below the plug valve to enclose and protect the valve stem from the abrasive material.

4. The apparatus of claim 1, wherein at least a portion of said shroud is lined on its exterior surface with a wear resistant material.

5. The apparatus of claim 1, wherein said housing includes guide tube means for guiding the movement of said valve stem with respect to said housing, said valve stem being movable between an extended position and a retracted position with respect to said guide means, and said tail section and said head section having a combined length at least equal to the length of the portion of said valve stem extending through said guide means when said valve stem is in its extended position.

6. The apparatus of claim 1, wherein:

said housing includes guide tube means for guiding the movement of said valve stem with respect to said housing; and said tail section of said shroud includes:

an outer tubular member mounted with said guide tube means and having a diameter greater than said valve stem; and an inner tubular member mounted with said outer tubular member and having a diameter greater than the diameter of said outer tubular member so that said cleaning fluid passageway of said tail section includes an inner fluid passageway between said valve stem and said inner tubular member and an outer fluid passageway between said inner and outer tubular members.

7. The apparatus of claim 1, wherein said cleaning fluid cavity of said head section of said shroud is greater in diameter than said tail section and an upper portion of said tail section is received in said cleaning fluid cavity so that an annular exhaust port is formed between said head section and said upper portion of said tail section for exhausting cleaning fluid from said cleaning fluid passageway.

8. The apparatus of claim 7, further including a lip mounted with a lower portion of said head section and extending inwardly toward said tail section to direct cleaning fluid flowing through said exhaust port in a stream surrounding said tail section.

* * * * *